United States Patent
Singla et al.

(10) Patent No.: US 12,461,808 B2
(45) Date of Patent: Nov. 4, 2025

(54) DATA STORAGE DEVICE AND METHOD FOR PROVIDING EXTERNAL-INTERRUPT-BASED CUSTOMIZED BEHAVIOR

(71) Applicant: Sandisk Technologies, Inc., Milpitas, CA (US)

(72) Inventors: Lovish Singla, Bangalore (IN); Shaheed Nehal A, Ludhiana (IN); Lovleen Arora, Mysore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 149 days.

(21) Appl. No.: 18/227,483

(22) Filed: Jul. 28, 2023

(65) Prior Publication Data

US 2024/0411636 A1 Dec. 12, 2024

Related U.S. Application Data

(60) Provisional application No. 63/472,041, filed on Jun. 9, 2023.

(51) Int. Cl.
*G06F 11/07* (2006.01)
(52) U.S. Cl.
CPC ...... *G06F 11/0793* (2013.01); *G06F 11/0727* (2013.01)
(58) Field of Classification Search
CPC ............... G06F 11/079; G06F 11/0793; G06F 11/3058; G06F 12/0246; G06F 12/0253; G06F 3/0614; G06F 3/0653; G06F 11/0727; G06F 11/0754
See application file for complete search history.

(56) References Cited

U.S. PATENT DOCUMENTS

| | | | |
|---|---|---|---|
| 9,575,677 B2 | 2/2017 | Ellis et al. | |
| 9,690,700 B2 | 6/2017 | Choi et al. | |
| 10,102,119 B2 | 10/2018 | Gopinath et al. | |
| 10,229,049 B2 | 3/2019 | Hashimoto | |
| 10,545,674 B1 | 1/2020 | Shvaiger et al. | |
| 2014/0173242 A1 | 6/2014 | Huffman et al. | |
| 2015/0135023 A1* | 5/2015 | Mekhanik | G11C 16/0483 714/704 |
| 2016/0239412 A1 | 8/2016 | Wada | |
| 2017/0242790 A1 | 8/2017 | O'Krafka et al. | |
| 2020/0192791 A1 | 6/2020 | Yang et al. | |
| 2021/0049086 A1* | 2/2021 | Bang | G06F 11/3058 |

(Continued)

OTHER PUBLICATIONS

International Search Report and Written Opinion mailed May 21, 2024 from PCT/US2024/011522.

*Primary Examiner* — Michael Maskulinski
(74) *Attorney, Agent, or Firm* — Crowell & Moring LLP

(57) ABSTRACT

A data storage device and method are disclosed for providing external-interrupt-based customized behavior. In one embodiment, a data storage device is provided comprising a memory and a controller configured to communicate with the memory. The controller is further configured to: receive an interrupt from a host indicating that a user is experiencing a performance problem with the data storage device; and in response to receiving the interrupt, take an action to address an issue in the data storage device that is causing the performance problem. Other embodiments are disclosed.

20 Claims, 6 Drawing Sheets

(56) References Cited

U.S. PATENT DOCUMENTS

2022/0171716 A1   6/2022   Benisty et al.
2022/0206920 A1*  6/2022   Bhat .................... G06F 3/0653
2023/0176742 A1   6/2023   Muthiah

* cited by examiner

DATA STORAGE DEVICE AND METHOD FOR PROVIDING EXTERNAL-INTERRUPT-BASED CUSTOMIZED BEHAVIOR

CROSS-REFERENCE TO RELATED APPLICATION

This application claims priority to U.S. provisional patent application No. 63/472,041, filed Jun. 9, 2023, which is hereby incorporated by reference.

BACKGROUND

A host can retrieve data from and/or store data in a data storage device. Once shipped and throughout its lifecycle, a data storage device can follow a predefined behavior path (e.g., based on memory behavior) or perform a predefined handling operation (e.g., error handling).

DETAILED DESCRIPTION

Figure 1A:
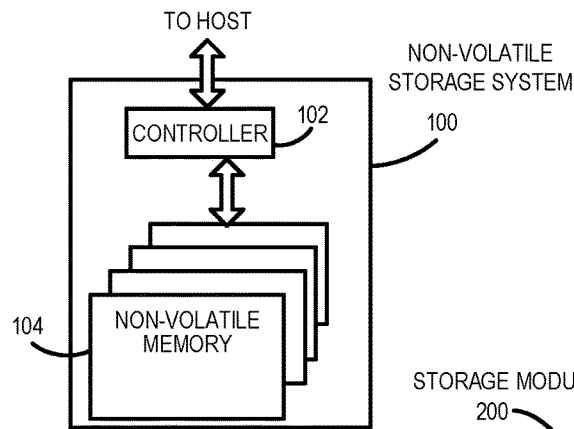
FIG. 1A is a block diagram of a data storage device of an embodiment.

The following embodiments generally relate to a data storage device and method for providing external-interrupt-based customized behavior. In one embodiment, a data storage device is provided comprising a memory and a controller configured to communicate with the memory. The controller is further configured to: receive an interrupt from a host indicating that a user is experiencing a performance problem with the data storage device; and in response to receiving the interrupt, take an action to address an issue in the data storage device that is causing the performance problem.

In some embodiments, the issue comprises a temperature of the memory exceeding a threshold and the action comprises performing thermal throttling to cool the memory.

In some embodiments, the action further comprises performing background operations with a reduced memory unit size.

In some embodiments, the action comprises performing a garbage collection operation as a foreground operation.

In some embodiments, the action comprises updating a time tag with a target digital-to-analog converter (DAC) shift value for a block in the memory.

In some embodiments, the action is performed only in response to receiving the interrupt.

In some embodiments, the action is performed during runtime.

In some embodiments, the action is performed as a background operation.

In some embodiments, the memory comprises a three-dimensional memory.

In another embodiment, a method is provided that is performed in a data storage device comprising a memory. The method comprises receiving an external interrupt in response to a user experiencing a performance problem with the data storage device; and in response to receiving the external interrupt, addressing an issue in the data storage device that is causing the performance problem.

In some embodiments, the external interrupt is generated by an application that is propriety to the data storage device.

In some embodiments, a feature of the application that allows the external interrupt to be sent to the data storage device is a subscription-based service.

In some embodiments, the external interrupt comprises a set of commands from a host.

In some embodiments, the set of commands comprises a dummy set of vendor-specific commands that are not used for user data transfer.

In some embodiments, the external interrupt is received as activation of a predetermined set of one or more pins on a bus.

In some embodiments, addressing the issue comprises performing a thermal throttling operation.

In some embodiments, addressing the issue comprises performing a garbage collection operation.

In some embodiments, addressing the issue comprises updating a digital-to-analog converter (DAC) shift value.

In some embodiments, the external interrupt is generic in that it does not instruct the data storage device to take a particular action.

In another embodiment, a data storage device comprising: a memory; means for receiving an interrupt indicating that a user is experiencing a performance problem with the data storage device; and means for taking an action, in response to receiving the interrupt, to address an issue in the data storage device that is causing the performance problem.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
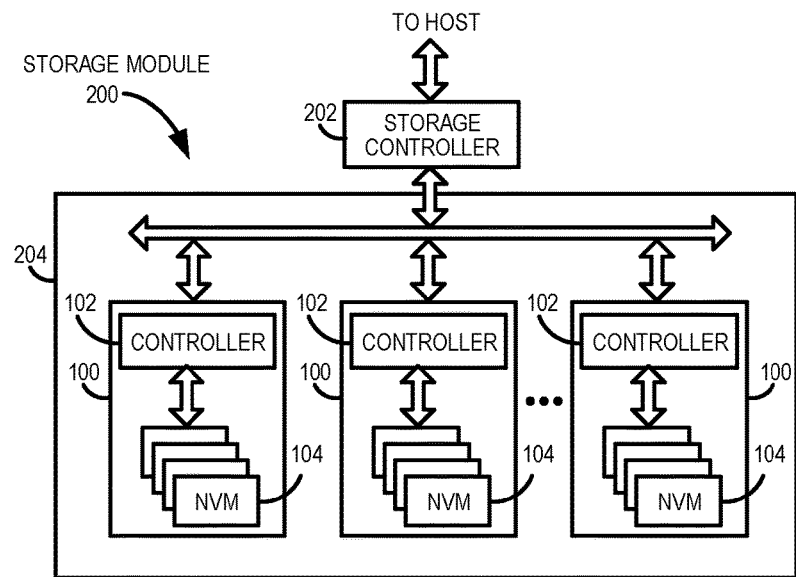
FIG. 1B is a block diagram illustrating a storage module of an embodiment.
Figure 1C:
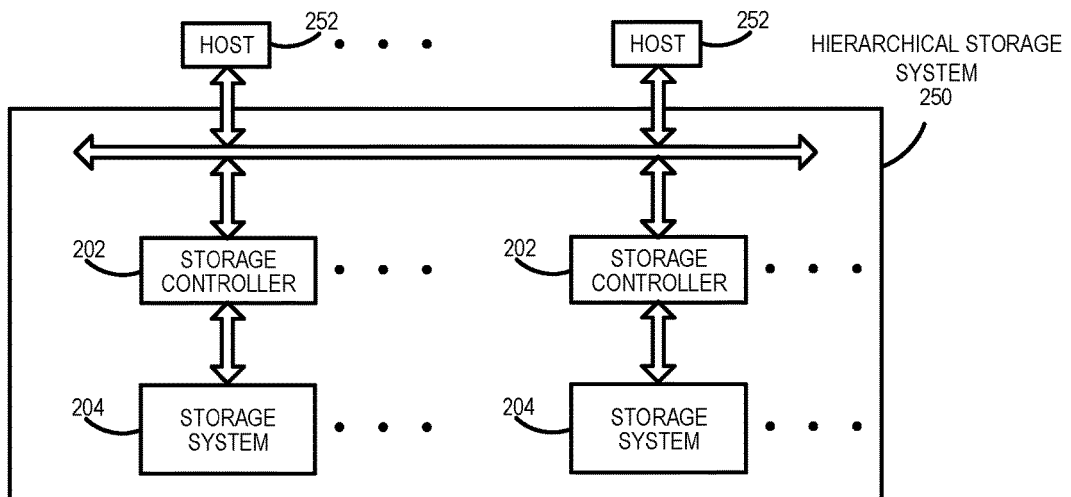
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
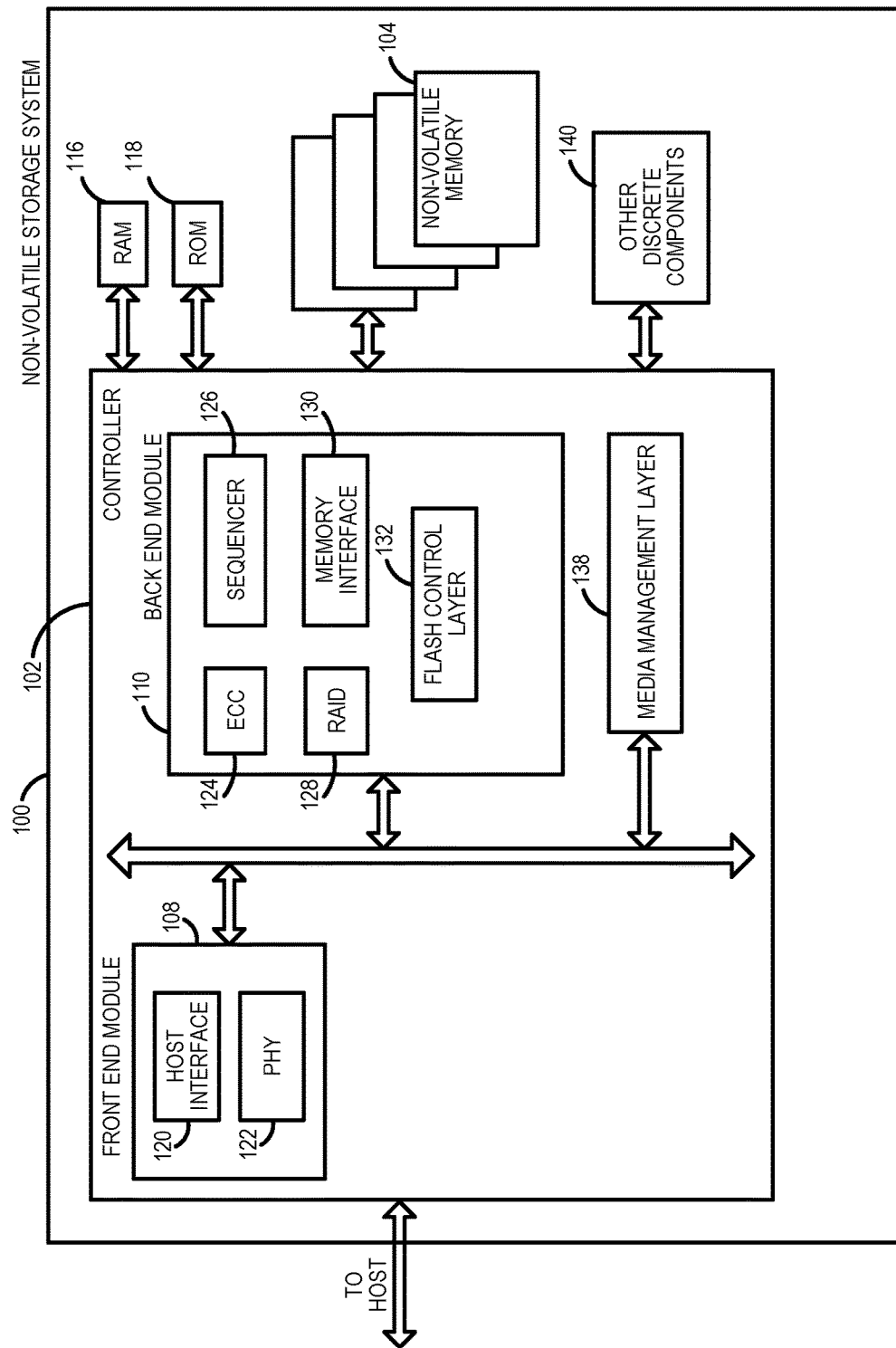
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
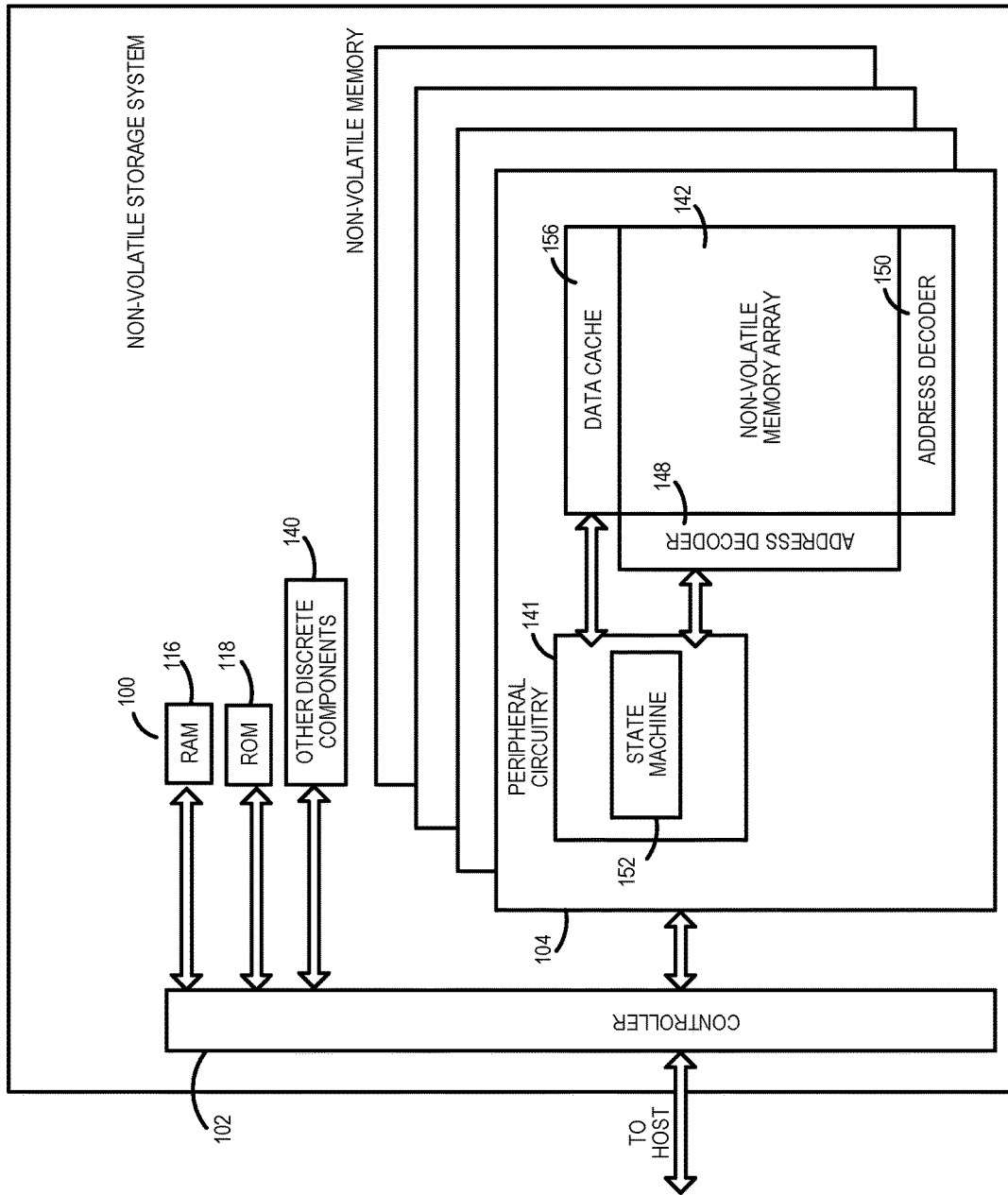
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
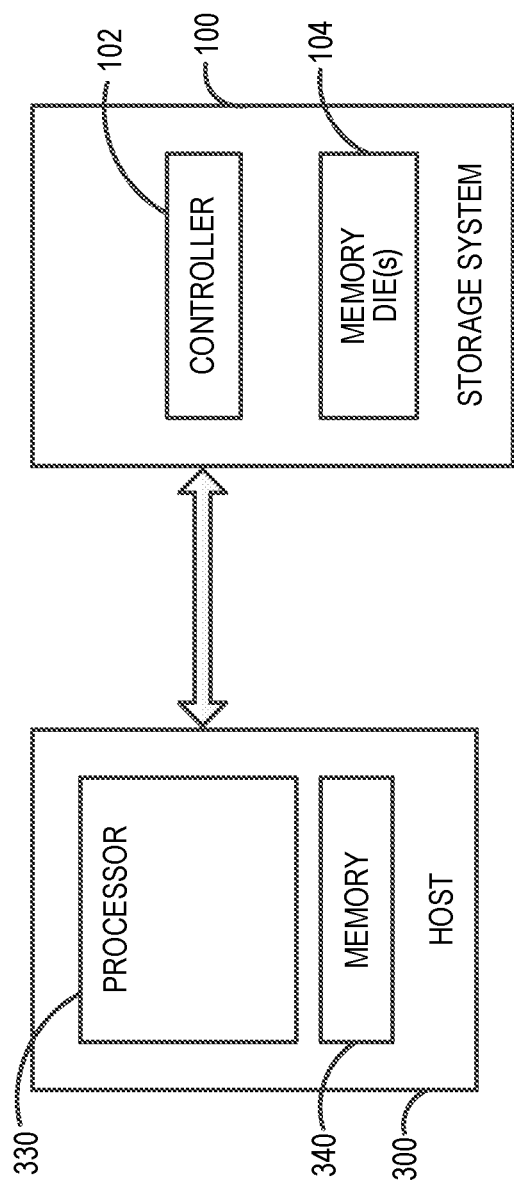
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 (which can be one or more processors) to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, once shipped in the market, the data storage device 100 can follow a predefined behavior path or handlings throughout its lifecycle. The behavior path or handlings in the data storage device 100 can be mostly related to memory behavior or error handlings. With the advancement in technology, there is a need to move toward more intelligent/smart devices that can change their behavior during runtime based on some external interrupts that can be either directly exposed to the host 300 or kept proprietary within an organization.

In one embodiment, a user is provided with a mechanism to cause the data storage device 100 to run an internal diagnostic and automatically perform internal operations to address any problem found during the internal diagnostic. For example, if the user detects a degradation in the user's experience with the data storage device 100 (e.g., the user is experiencing an increased wait time when retrieving or storing data, is perceiving that the retrieved data as "glitchy," or is otherwise having the sense that "something is wrong" with the data storage device 100), the user can interact with an application on the host 300 to send an external interrupt (a "generic help ticket") to the data storage device 100. In response to receiving this interrupt from the host 300, the controller 102 in the data storage device 100 can, without being directed by the host 300 to take a specific action (e.g., thermal throttling, garbage collection, updating a digital-to-analog converter (DAC) shift), determine what may be causing the problem that the user is sensing and take action(s) to correct the problem.

The application on the host 300 that sends the interrupt to the data storage device 100 can take any suitable form. For example, the application can be a propriety application that is associated with the manufacturer of the data storage device 100. So, after the user purchases the data storage device 100, the user can download an app onto the host 300 (e.g., phone, tablet, computer, etc.). If the user is experiencing a problem with the data storage device 100, the user can run the app and press a displayed button (or otherwise actuate a user input element) to cause the app on the host 300 to send the interrupt to the data storage device 100.

As mentioned above, this interrupt is "generic" in the sense that it is not instructing the data storage device 100 to perform a specific action and/or is not specifying a specific range of logical block addresses in the memory 104. In this way, the user can consider the software application on the host 300 as a "black box," where the external interrupts generated by the host 300 and sent to the data storage device 100 "somehow" (from the user's perspective) change the behavior of the data storage device 100 to improve the overall user experience. That is, the user does not need to be aware of what internal condition or previous operation of the data storage device 100 led to the data storage device's performance, thus potentially changing the user mindset to run the app/software more frequently, which can give the data storage device 100 more time to complete background operations. In another embodiment, the actions needed to respond to the user's request for help can be exposed directly to the host 300 using a command/sequence of commands, wherein host 300 itself can trigger the interrupts.

Also, with these embodiments, extreme/complex handlings provided for by the interrupts may not be otherwise performed in the regular firmware flow due to stringent timeouts. So, these embodiments can be used to handle different conditions in the controller 102 without impacting the regular flow and without taking any hit on performance, thus leading to a better user experience. In some embodiments, the action(s) taken by the controller 102 in response to the interrupts can be performed during runtime or be used to trigger a background operation earlier. Further, in some embodiments, different interrupt-based handlings can be enabled in the data storage device 100, and the application on the host 300 that the user uses to improve the overall user experience of the data storage device 100 can be a subscription-based service.

The interrupt sent by the host 300 to the data storage device 100 can take any suitable form. For example, in one embodiment, the external interrupt takes the form of a command or sequence of commands. In another embodiment, the external interrupt takes the form of an activation of a predetermined set of one or more pins on a bus. The external interrupt can take other forms. Also, in one embodiment, the action(s) that the controller 102 takes in response to receiving the interrupt are only performed when the interrupt is received. So, if the interrupt is not received, the controller 102 will not execute those operation(s) (e.g., the code will not be executed by any internal calls within the firmware but will be entirely called only if an external interrupt is received from the host 300). In other embodiments, the action(s) can be performed in other situations where the interrupt is not received.

Also, in one embodiment, the interrupt is triggered by an application or software on the host 300, which can issue dummy sequences, or the control can be given to the host 300 directly where a particular command/sequence (e.g., a vendor-specific command) is exposed. In this embodiment, this sequence does not have a user data transfer and can be treated as a dummy sequence that triggers the controller 102 to perform a certain operation(s)/handling(s) that can improve the overall user experience but are unknown to the host 300 or user.

Some examples of these embodiments will now be discussed. It should be understood that there are merely examples and that other implementations can be used. As such, the details of these examples should not be read into the claims unless they are expressly recited therein.

Figure 4:
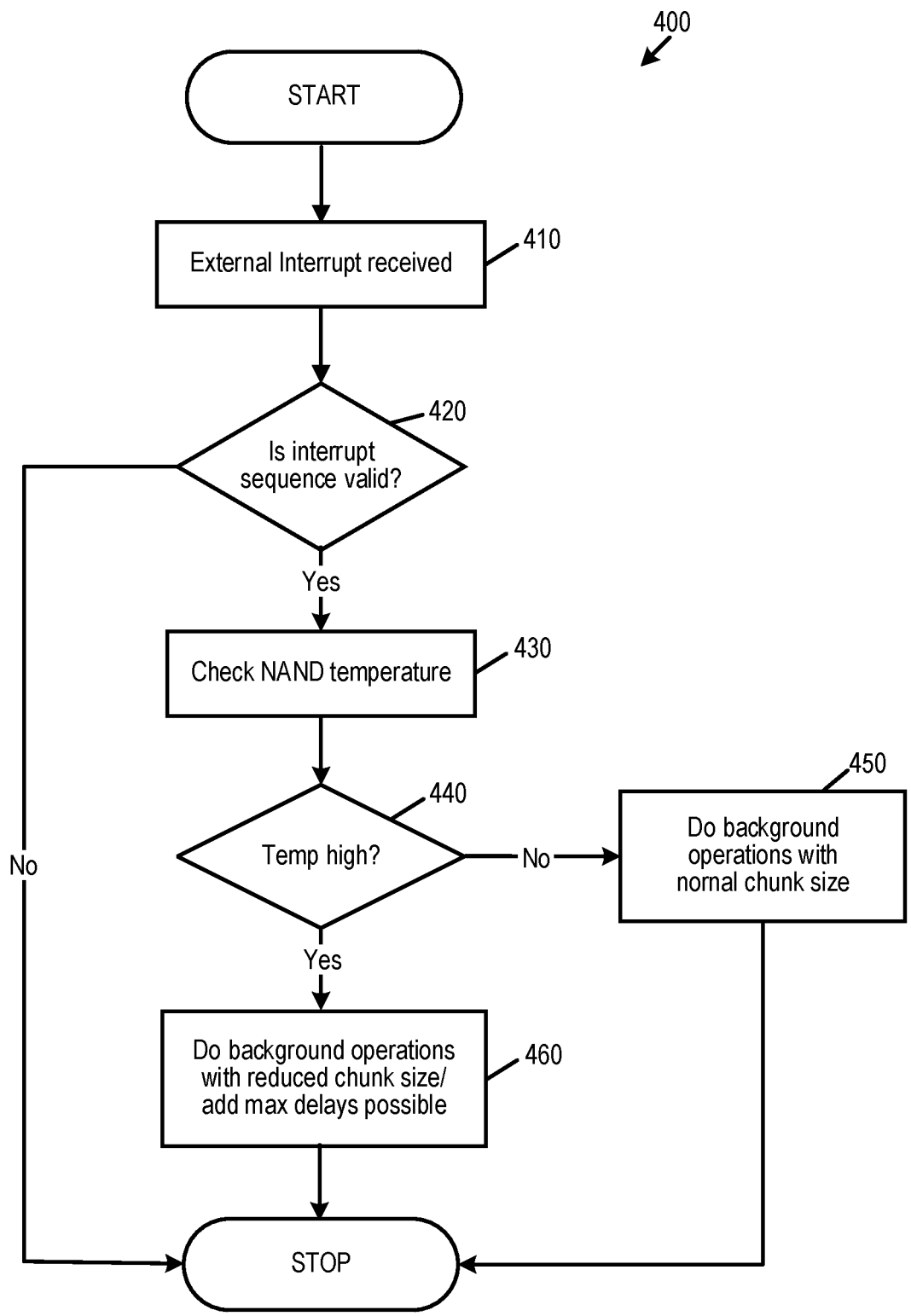
FIG. 4 is a flow chart of a method of an embodiment for providing external-interrupt-based customized behavior.

Turning now to the example illustrated in the flow chart 400 in FIG. 4, the user detects a performance drop in the data storage device 100 and clicks a displayed button or otherwise causes the host 300 to issue the generic external interrupt to the data storage device 100 (act 410). The controller 102 then determines if the interrupt sequence in the external interrupt is valid (act 420). If the interrupt sequence is not valid, the method ends. However, if the interrupt sequence is valid, the controller 102 checks the temperature of the memory 104 (act 430) to determine if the temperature is above a threshold (act 440). If the temperature is not above the threshold, the controller 102 performs a background operation on a standard, predetermined portion of the memory 104 (e.g., using a "normal chuck size") (act 450). However, if temperature is above the threshold, the controller 102 can perform a NAND thermal throttling operation, which forces the user to not issue further commands for some time. During this time, the controller 102 performs background operations with a reduced or minimal chunk size and increases the delays between the memory operations, thus cooling down the memory 104 (act 460). When the background operations complete and the user starts to use the data storage device 100 again, there will be an improvement in the performance as all the background operations would have been completed, and the data storage device 100 would be operating at normal temperature.

Figure 5:
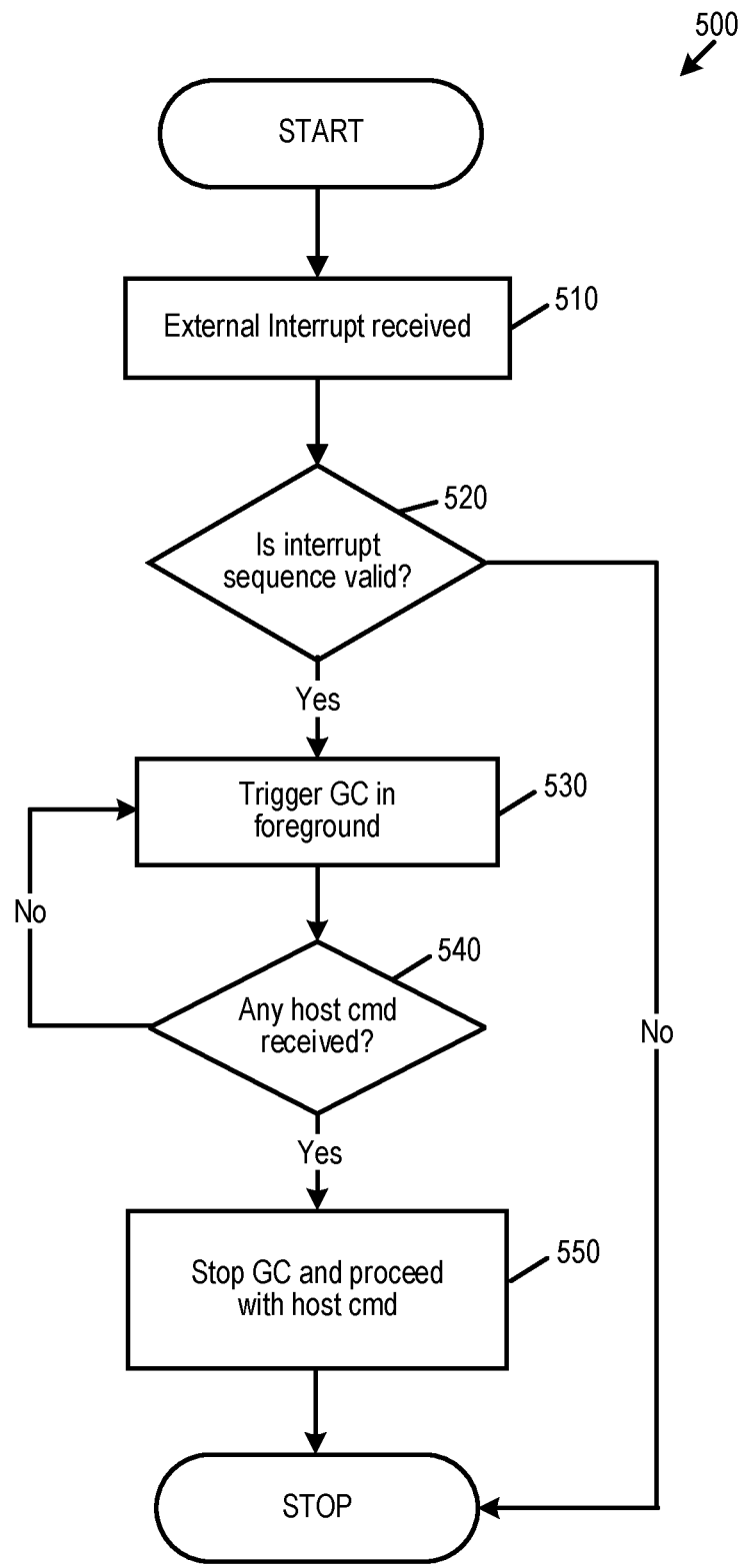
FIG. 5 is a flow chart of a method of an embodiment for providing external-interrupt-based customized behavior.

Another example is shown in the flow chart 500 in FIG. 5. As shown in FIG. 5, after the start of the method, the controller 102 receives an external interrupt from the host 300 (act 510). The controller 102 then determines if the interrupt sequence in the external interrupt is valid (act 520). If the interrupt sequence is not valid, the method ends. However, if the interrupt sequence is valid, the controller 102 triggers a garbage collection operation in the foreground (act 530). In this example, as part of its normal firmware flow, the controller 102 performs garbage collection as a background operation during write commands (e.g., for ~150 ms) based on certain thresholds, such as a minimum number of blocks that are left in the memory 104). Garbage collection and background operations can have a direct impact on the performance of the data storage device 100, and, in certain corner scenarios, the controller 102 can operate in an "urgent" mode, which drops the performance of the data storage device 100 drastically. In this example, apart from the regular handling of garbage collection, in response to receiving the external interrupt from the host 300, the controller 102 can add additional handling where background operations can be done in the foreground irrespective of the threshold (e.g., "forced" garbage collection). With this handling, whenever the user uses the specialized/proprietary application on the host 200 or issues a specific command sequence from the host 300, the controller 102 can start to perform garbage collection as a foreground operation and can clear pending background operations without taking a hit on the performance during write operations. As shown in FIG. 5, the controller 102 checks to see if any command from the host 300 was received (act 540). If a command from the host 300 was not received, the controller 102 loops back to act 530. However, if a command from the host 300 was received, the controller 102 stops the garbage collection operation and proceeds with the host command (act 550).

In yet another example, a time tag (e.g., with target/optimum digital-to-analog converter (DAC) shifts) for each block in the memory 104 can be stored once the block is fully written. The shift can change over time, so it may be desired to update the stored time tags. If a read with a stored shift results in a bit-error rate (BER) above a threshold, the controller 102 may need to perform a bit error rate (BER) estimation scan (BES) operation and find the optimum DAC shift. This operation, if performed during regular command execution, can take time and impact read performance. So, in this example, the controller 102 can be configured to, in response to receiving the interrupt from the host 300, trigger scanning of all the blocks in the memory 104 to check if stored time tags are valid for that block. In a new target/ optimum shift is needed for a block due to a high BER, the controller 102 can perform a BES operation and update the time tag of all the blocks without impacting the read performance during host operations.

There are many alternatives that can be used with these embodiments. For example, the interrupt can be triggered at any point of time/at regular intervals/during a problem by the host 300 as recommended by the data storage device 100. The controller 102 of the data storage device 100 can figure out the best possible handling to provide the optimum output to the host 300.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/ or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   a processor configured to communicate with the memory and further configured to:
   receive an interrupt from a host indicating that a user is experiencing a performance problem with the data storage device; and
   in response to receiving the interrupt, take an action to address an issue in the data storage device that is causing the performance problem;
   wherein the action comprises updating a time tag with a target digital-to-analog converter (DAC) shift value for a block in the memory.

2. The data storage device of claim 1, wherein the issue comprises a temperature of the memory exceeding a threshold and the action further comprises performing thermal throttling to cool the memory.

3. The data storage device of claim 2, wherein the action further comprises performing background operations with a reduced memory unit size.

4. The data storage device of claim 1, wherein the action further comprises performing a garbage collection operation as a foreground operation.

5. The data storage device of claim 1, wherein the action is performed only in response to receiving the interrupt.

6. The data storage device of claim 1, wherein the action is performed during runtime.

7. The data storage device of claim 1, wherein the action is performed as a background operation.

8. The data storage device of claim 1, wherein the memory comprises a three-dimensional memory.

9. The data storage device of claim 1, wherein the interrupt comprises a user-initiated interrupt.

10. A method comprising;
    performing in a data storage device comprising a memory:
    receiving an external interrupt in response to a user experiencing a performance problem with the data storage device; and
    in response to receiving the external interrupt, addressing an issue in the data storage device that is causing the performance problem, wherein addressing the issue comprises performing a thermal throttling operation.

11. The method of claim 10, wherein the external interrupt is generated by an application that is propriety to the data storage device.

12. The method of claim 11, wherein a feature of the application that allows the external interrupt to be sent to the data storage device is a subscription-based service.

13. The method of claim 10, wherein the external interrupt comprises a set of commands from a host.

14. The method of claim 13, wherein the set of commands comprises a dummy set of vendor-specific commands that are not used for user data transfer.

15. The method of claim 10, wherein the external interrupt is received as activation of a predetermined set of one or more pins on a bus.

16. The method of claim 10, wherein addressing the issue further comprises performing a garbage collection operation.

17. The method of claim 10, wherein addressing the issue further comprises updating a digital-to-analog converter (DAC) shift value.

18. The method of claim 10, wherein the external interrupt is generic in that it does not instruct the data storage device to take a particular action.

19. The method of claim 10, wherein the external interrupt comprises a user-initiated interrupt.

20. A data storage device comprising:
    a memory; and
    means for:
    receiving a user-initiated interrupt indicating that a user is experiencing a performance problem with the data storage device;
    in response to receiving the user-initiated interrupt, running an internal diagnostic to determine an issue in the data storage device that is causing the performance problem; and
    automatically performing an internal operation to address the issue in the data storage device that is causing the performance problem.

* * * * *